US012188263B2

(12) United States Patent
Milost et al.

(10) Patent No.: US 12,188,263 B2
(45) Date of Patent: Jan. 7, 2025

(54) ELECTROMAGNETIC DOOR LOCK

(71) Applicant: Illinois Tool Works inc., Glenview, IL (US)

(72) Inventors: Uros Milost, Glenview, IL (US); Matic Lesjak, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 747 days.

(21) Appl. No.: 16/626,650

(22) PCT Filed: Jul. 3, 2018

(86) PCT No.: PCT/US2018/040725

§ 371 (c)(1),
(2) Date: Dec. 26, 2019

(87) PCT Pub. No.: WO2019/010187

PCT Pub. Date: Jan. 10, 2019

(65) Prior Publication Data

US 2020/0115843 A1 Apr. 16, 2020

(30) Foreign Application Priority Data

Jul. 5, 2017 (IT) .......................... 102017000075600

(51) Int. Cl.
*D06F 39/14* (2006.01)
*A47L 15/42* (2006.01)
(Continued)

(52) U.S. Cl.
CPC .......... *E05B 47/0603* (2013.01); *D06F 34/20* (2020.02); *D06F 39/14* (2013.01);
(Continued)

(58) Field of Classification Search
CPC .......... D06F 39/14; D06F 37/42; D06F 34/20; A47L 15/4259; E05B 2047/0068;
(Continued)

(56) References Cited

U.S. PATENT DOCUMENTS 4,565,994 A * 1/1986 Mochida ................. E05B 45/06 70/1.5
5,862,691 A * 1/1999 Friedrich ................ E05B 17/22 70/264
(Continued)

FOREIGN PATENT DOCUMENTS

CN 101080528 A 11/2007
CN 101686792 A 3/2010
(Continued)

OTHER PUBLICATIONS

Computer Generated Translation for DE 202015100627, Generated on May 24, 2023, https://worldwide.espacenet.com/ (Year: 2023).*
(Continued)

*Primary Examiner* — Alyson M Merlino
(74) *Attorney, Agent, or Firm* — Boyle Fredrickson, S.C.

(57) ABSTRACT

An electromagnetic door lock is provided for locking the door of a domestic appliance. The electromagnetic door lock may include a rotating cam that rotates about an axis between an open-door position and closed-door position. The rotating cam may cooperate with a hook fixed to a door of a domestic appliance. A locking device locks the rotating cam in the locking position. The locking device includes an electromagnetic actuator configured for moving a locking pin between a locking position and an unlocking position. A door sensing device includes a door sensing element movable between a first position and a second position that respectively correspond to the open-door position and to the closed-door position of the rotating cam. At least one
(Continued)

contactless proximity sensor may detect the locking position of the locking pin.

9 Claims, 5 Drawing Sheets

(51) Int. Cl.

| | |
|---|---|
| ***D06F 34/20*** | (2020.01) |
| ***E05B 47/00*** | (2006.01) |
| ***E05B 47/06*** | (2006.01) |
| *D06F 34/10* | (2020.01) |
| *E05C 3/24* | (2006.01) |

(52) U.S. Cl.
CPC ........... *A47L 15/4259* (2013.01); *D06F 34/10* (2020.02); *E05B 47/0002* (2013.01); *E05B 2047/0068* (2013.01); *E05C 3/24* (2013.01)

(58) Field of Classification Search
CPC ..... E05B 2047/0069; E05B 2047/0067; E05B 47/0002; E05B 47/0003; E05B 47/0004; E05B 47/06; E05B 47/0603; E05B 47/0607; Y10S 292/69
See application file for complete search history.

(56) References Cited

U.S. PATENT DOCUMENTS

| | | | | | |
|---|---|---|---|---|---|
| 5,879,036 | A * | 3/1999 | Moline | E05B 47/0607 | 292/210 |
| 6,886,868 | B2 * | 5/2005 | Hengelein | D06F 39/14 | 292/201 |
| 7,026,897 | B2 * | 4/2006 | Lamb | E05B 85/26 | 335/207 |
| 8,109,543 | B2 * | 2/2012 | Chirumbolo | E05B 47/0607 | 292/201 |
| 9,587,837 | B2 * | 3/2017 | Colucci | E05B 47/0603 | |
| 9,777,514 | B2 * | 10/2017 | Haidvogl | E05B 47/0607 | |
| 10,876,735 | B2 * | 12/2020 | Ivanovic | F24C 14/02 | |
| 10,914,026 | B2 * | 2/2021 | Uros | D06F 39/14 | |
| 11,124,915 | B2 * | 9/2021 | Bicic | D06F 39/14 | |
| 11,220,779 | B2 * | 1/2022 | Bicic | D06F 39/14 | |
| 2004/0130315 | A1 | 7/2004 | Lamb et al. | | |
| 2004/0134239 | A1 | 7/2004 | Hapke et al. | | |
| 2006/0288742 | A1 * | 12/2006 | Hapke | D06F 37/42 | 134/58 DL |
| 2009/0236865 | A1 | 9/2009 | Dziurdzia et al. | | |
| 2010/0139338 | A1 * | 6/2010 | Wintersteiger | E05B 47/0607 | 70/264 |
| 2015/0267446 | A1 | 9/2015 | Promutico | | |
| 2017/0067271 | A1 | 3/2017 | Schroeder | | |

FOREIGN PATENT DOCUMENTS

| | | | | |
|---|---|---|---|---|
| CN | 101970781 A | | 2/2011 | |
| CN | 104968852 A | | 10/2015 | |
| DE | 202015100627 U1 | * | 6/2015 | D06F 37/28 |
| DE | 102014226049 A1 | * | 8/2015 | D06F 39/14 |
| WO | WO-9949159 A1 | * | 9/1999 | E05B 81/14 |
| WO | 2013181289 A1 | | 12/2013 | |
| WO | 2014113211 A1 | | 7/2014 | |

OTHER PUBLICATIONS

Computer Generated Translation for WO 99/49159, Generated on May 24, 2023, https://worldwide.espacenet.com/ (Year: 2023).*
International Search Report for PCT/US2018/040725, Dated: Jul. 3, 2018.

* cited by examiner

ELECTROMAGNETIC DOOR LOCK

FIELD OF THE INVENTION

The present invention relates to an electromagnetic door lock for domestic appliances, in particular for washing machines.

BACKGROUND OF THE INVENTION

A door lock has the purpose of ensuring that the door of a domestic appliance is locked in the closed position and can only be opened when sufficient time has lapsed after the end of an operating cycle.

In many cases, in addition to the locking function, the door locking device should also be provided with a door sensing switch. The function of the door sensing switch is to prevent the start of the domestic appliance (e.g. the start of a washing cycle) when the door is open and in some special circumstances which are described in one of the IEC standards for domestic appliances.

A number of solutions are known for sensing the closed position of the door and for closing a door sensing switch when the door is closed.

WO2013181289 discloses an electromagnetic door lock for locking the door of a domestic appliance, comprising a door sensing device including a door sensing pin cooperating with a bistable switch which snaps from an open position to a closed position when the door sensing pin moves from an extracted position to a retracted position.

The bistable switch includes metal contact strips, attached to or integrally formed with the terminals used to electrically connect the door lock to the control unit of appliance. These metal components are usually provided with contact rivets, which can be attached, for example by riveting, onto metal components or can be formed by a contact material welded to the metal components.

Because of the geometry of the parts which constitute the switches and because of the characteristics of the materials applied, the door locks according to the prior art have the following drawbacks:

a) Bouncing of the switch components, e.g. metal strips. This can cause malfunction of the control units to which the switch integrated in door lock is connected. The control units of the appliances are nowadays prevalently electronic, so the switch integrated in door lock is connected e.g. to the inputs of a microprocessor or other electronic components. In case of switch bouncing, the operation of these electronic components can be disturbed, causing malfunction of the control unit.

b) Wear of the switch components, e.g. of the contact rivets. During switching of the door lock, the components constituting the switch move relatively to each other so wear of e.g. contact rivets occurs, causing deterioration of switch characteristics. As the result of this, electrical resistance of contact components increases and this can potentially cause malfunction of the electronic control unit. Contact surfaces can also be damaged by electric arc, which may occur with certain gaps between the contact elements and with voltage applied to the contact elements exceeding a certain threshold. As the result contact resistance increases.

OBJECT AND SUMMARY OF THE INVENTION

The object of the present invention is to provide an electromagnetic door lock with an integrated door sensing switch which overcomes the above drawbacks.

In accordance with the present invention, this object is achieved by an electromagnetic door lock having the features of claim 1.

Preferred embodiments of the invention are disclosed in the dependent claims.

The claims form an integral part of the teaching administered in relation to the invention.

BRIEF DESCRIPTION OF THE DRAWINGS

Embodiments of the present invention will now be described in detail with reference to the annexed drawings, given purely by way of non-limiting example, in which.

Figure 1:
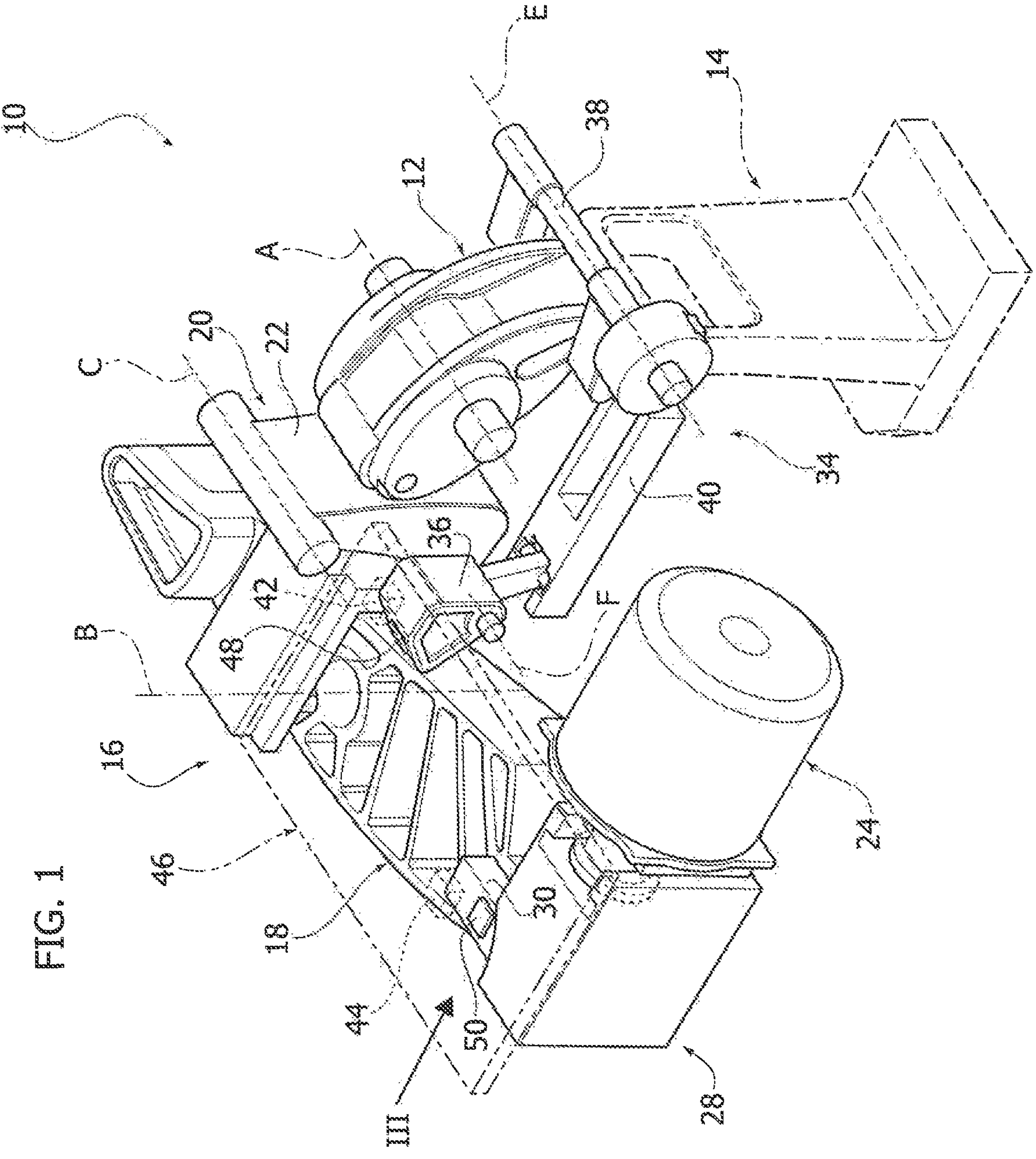
FIGS. 1 and 2 are perspective views of an electromagnetic door lock according to the present invention in an open-door position and in a closed and locked door position, respectively.

It should be noted that in the drawings some components have been removed to show more clearly the relevant aspects of the embodiments.

DETAILED DESCRIPTION OF THE INVENTION

With reference to the drawings, the reference number 10 indicates an electromagnetic door lock for locking the door of a domestic appliance, in particular a washing machine. The door lock 10 comprises a rotating cam 12, which rotates about a first axis A between an open-door position (FIG. 1) and closed-door position (FIG. 2). The rotating cam 12 cooperates with a hook 14 fixed to a door (not shown) of a domestic appliance. The hook 14 engages the rotating cam 12 in the open-door position of FIG. 1 and, during closure of the door, causes the rotating cam 12 to rotate about the first axis A to the closed-door position shown in FIG. 2. In the closed-door position the rotating cam 12 is engaged with the hook 14 and holds the door of the appliance in a closed position.

The door lock 10 comprises a locking device 16 arranged to lock the rotating cam 12 in the closed-door position. The locking device 16 comprises a main lever 18 rotatable about a second axis B and a rocker arm 20 rotatable about a third axis C. The rocker arm 20 has a surface 22 in contact with the rotating cam 12. The main lever 18 cooperates with the rocker arm 20 and biases the rocker arm 20 in contact with the rotating cam 12.

Figure 3:
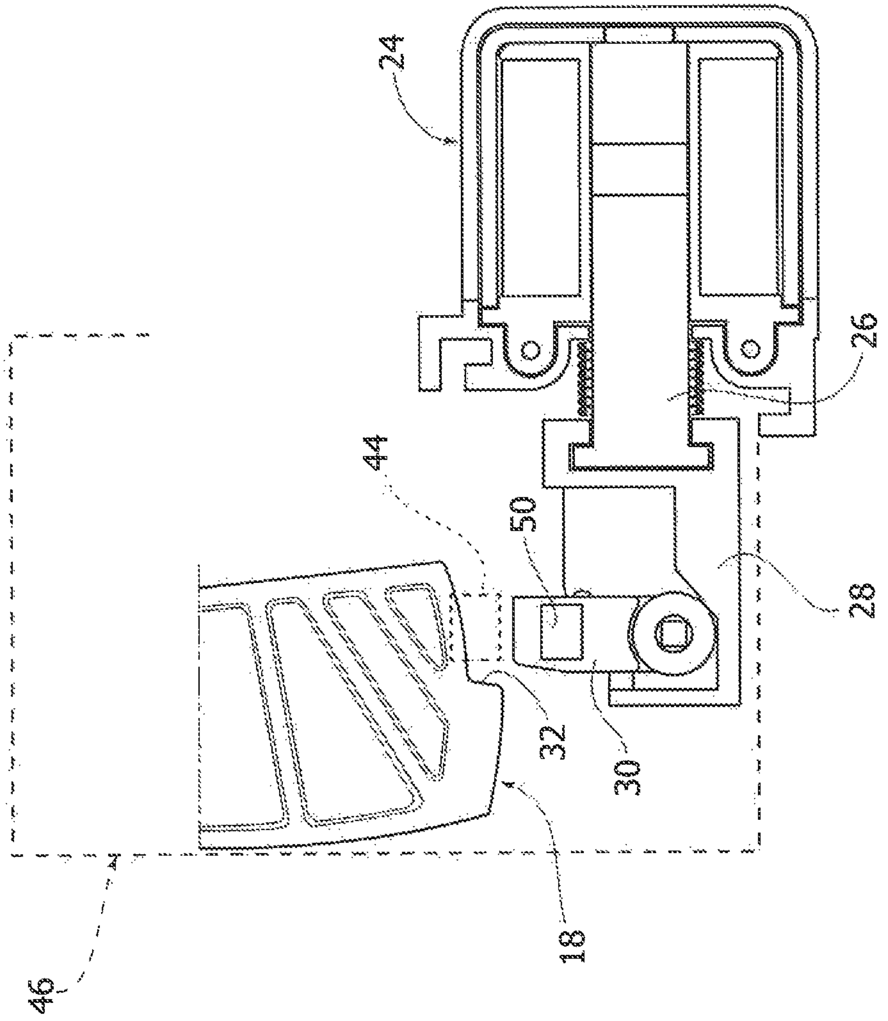
FIGS. 3 and 4 are plan views of the detail indicated by the arrows III and IV in FIGS. 1 and 2.
Figure 4:
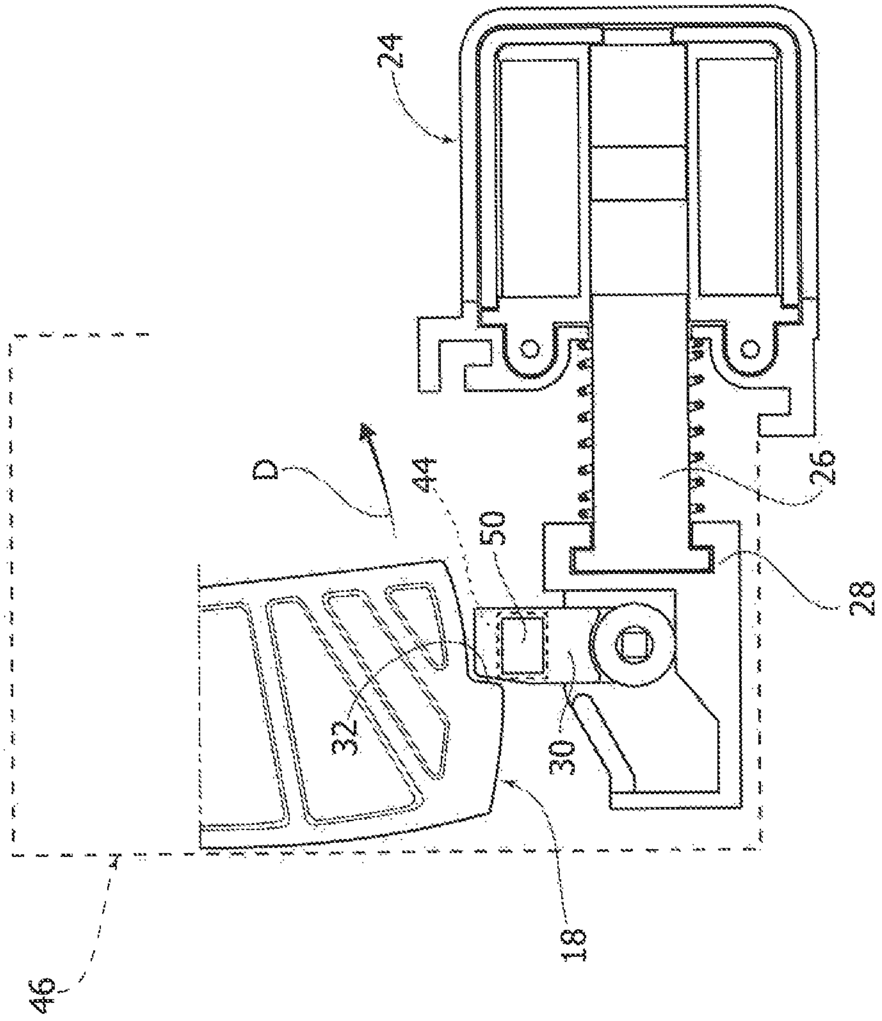

The locking device 16 includes an electromagnetic actuator 24. With reference to FIGS. 3 and 4, the electromagnetic actuator 24 has a solenoid core 26 movable between a retracted position (FIG. 3) and an extended position (FIG. 4). A cam element 28 is attached at the distal end of the solenoid core 26. A locking pin 30 cooperates with the cam element 28 and moves between an unlocking position (FIG. 3) corresponding to the retracted position of the solenoid core 26 and a locking position (FIG. 4) corresponding to the extended position of the solenoid core 26.

When the locking pin 30 is in the locking position it engages a surface 32 of the main lever 18 and prevents a rotation of the main lever in an anticlockwise direction. An attempt to open the door, e.g. by the user of appliance, causes the main lever 18 to rotate in counterclockwise direction, as indicated by the arrow D in FIG. 4. The locking pin 30 prevents a rotation of main lever 18, so it is impossible to open the door. Therefore, in this condition the rotating cam 12 is locked in the closed-door position.

Figure 2:
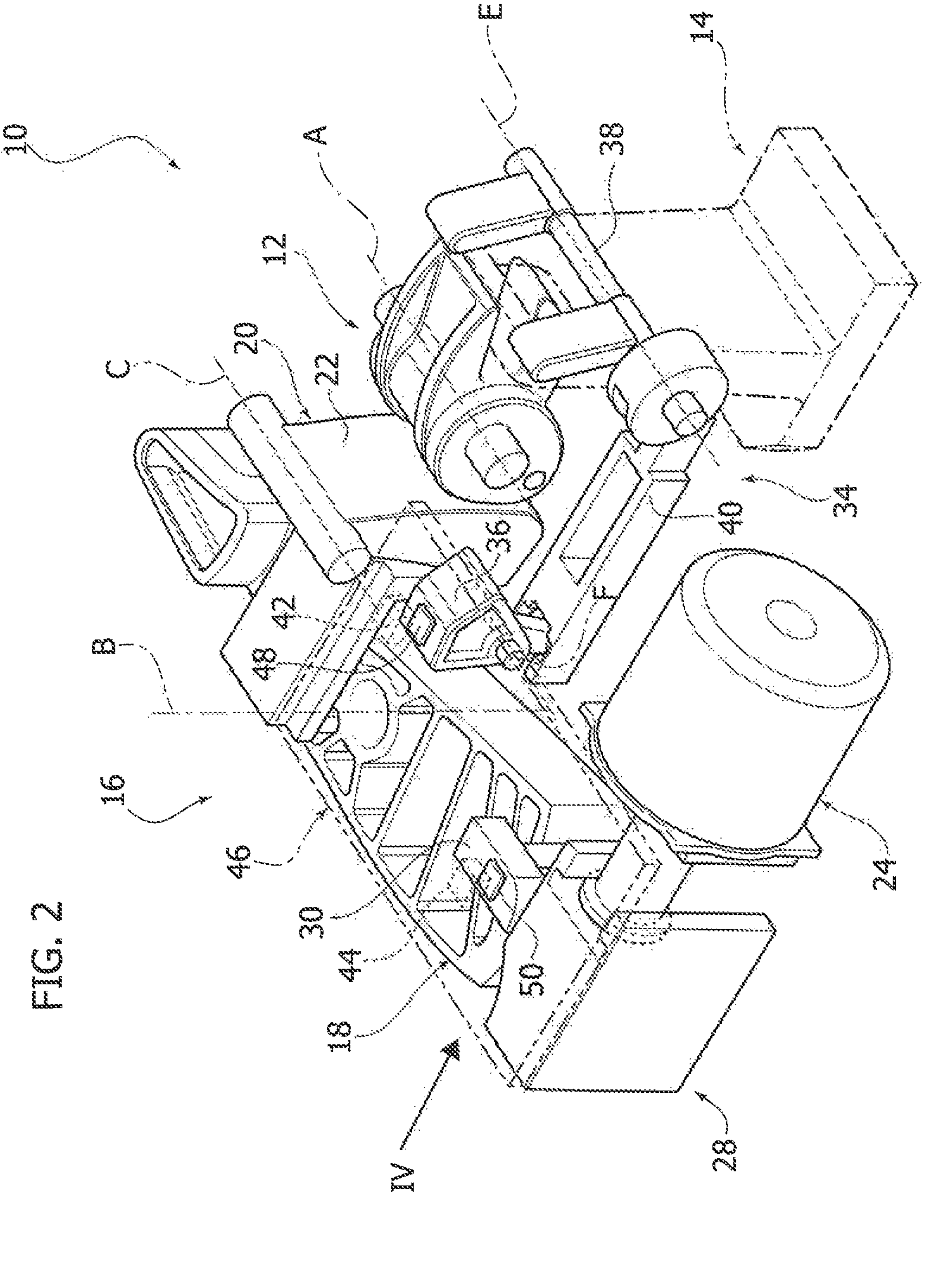
Figure 5:
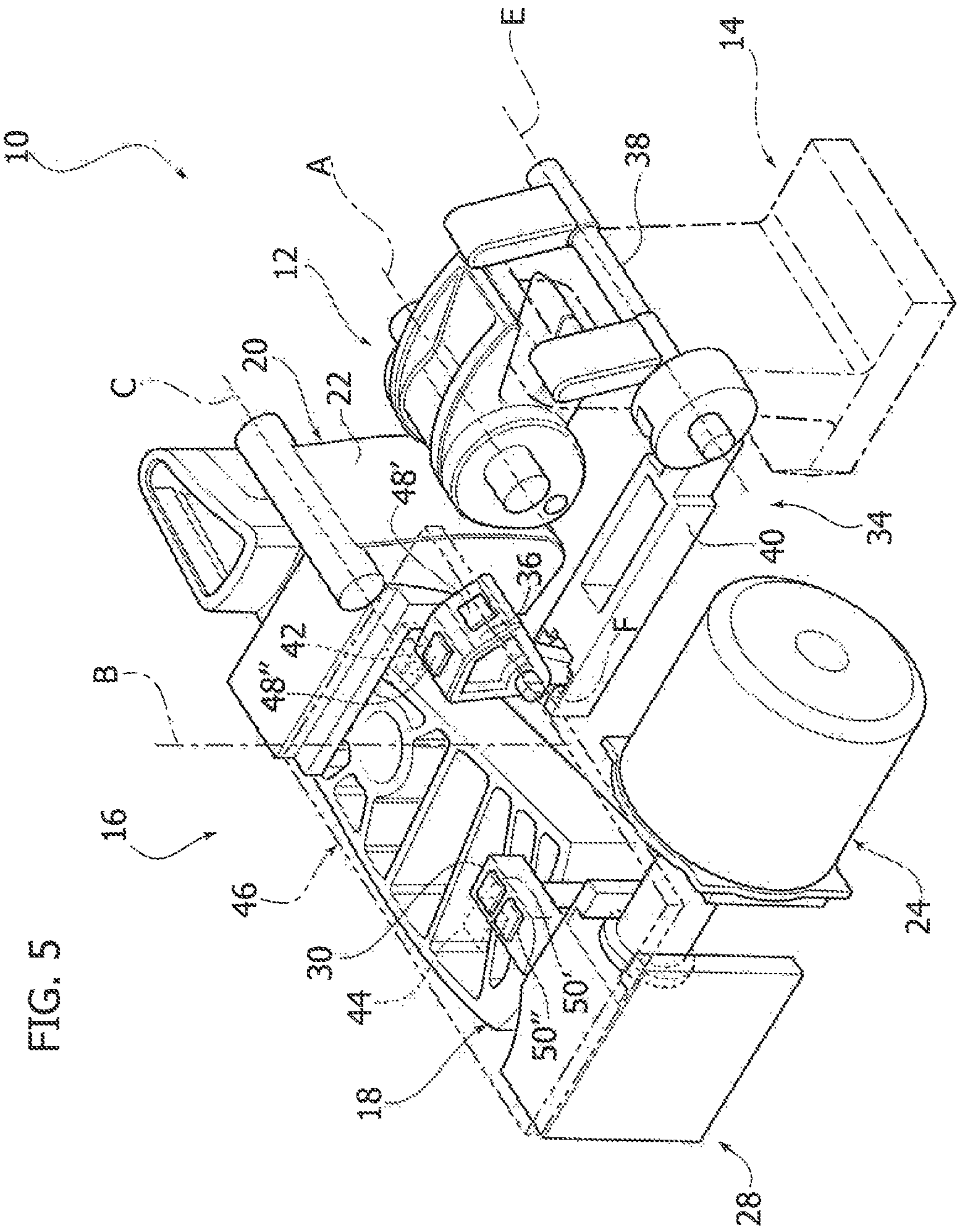
FIG. 5 is a perspective view of an alternative embodiment of an electromagnetic door lock according to the present invention.

With reference to FIGS. 1, 2 and 5, the door lock 10 comprises a door sensing device 34. The door sensing device 34 includes a door sensing element 36 movable between a first position (FIG. 1) and a second position (FIGS. 2 and 5) corresponding, respectively, to the open-door position and to the closed-door position of the rotating cam 12. The door sensing device 34 may include a door sensing lever 38 which may be rotatable about an axis E and a door sensing slider 40 connected to the door sensing lever 38 and to the door sensing element 36.

As shown in FIGS. 1 and 2, the rotating cam 12 is in contact with the door sensing lever 38. The rotation of the rotating cam 12 from the open-door position to the closed-door position causes a rotation of the door sensing lever 38 about the axis E, which in turn causes—through the door sensing sider 40—a movement of the door sensing element 36 from the first position to the second position.

The movement of the door sensing element 36 from the first position to the second position may be a rotation about an axis F.

With reference to FIGS. 1, 2 and 5, the door lock 10 comprises a first contactless proximity sensor 42 which detects the second position of the door sensing element 36.

In one or more embodiments, the door lock 10 comprises a second contactless proximity sensor 44 which detects the locking position of the locking pin 30.

The first or the second contactless proximity sensor 42, 44 may be carried by a stationary support 46, for instance a printed circuit board. The first or second contactless proximity sensor 42, 44 may cooperate with at least one respective actuating element 48, 50 carried by the door sensing element 36 or by the locking pin 30.

The first and the second contactless proximity sensor 42, 44 replace the electromechanical switches of the prior art solutions. The first and the second contactless proximity sensor 42, 44 may be magnetic sensors, like Hall sensors, magnetoresistive (MR) sensor, optical sensors and the like.

The description of the exemplary embodiment and the accompanying drawings are based on magnetic sensors, but the invention is not limited to them. In one or more embodiments, sensors based on other principles can be implemented to sense the relative positions of movable and non-movable parts in the door lock 10.

In case of sensors based on magnetic principle of operation, the actuating elements 48, 50 are preferably made of magnetic or magnetizable material, for example permanent magnets, but may also be made of other materials suitable for detection by the contactless proximity sensors 42, 44. The magnets can be fixed to the respective supports, for example door sensing element 36 or locking pin 30, by snap-fixation, gluing, over-molding or other suitable processes.

Preferably, the contactless proximity sensors 42, 44 are carried by a stationary support 46, e.g. a printed circuit board, as shown in the drawings, which can contain also other electronic or electromechanical elements needed for the operation of the sensors 42, 44. The part carrying the sensors 42, 44 can contain other electronic elements needed for its operation and preferably contains connections to connect electrical signals to the control unit of appliance. The sensors 42 and 44 can be carried by a single printed circuit board 46 (as shown in the described embodiment) or by two separate printed circuit boards, depending on the applications.

The basic principle of operation is the same for all pairs sensors/actuating elements in the door lock 10. In case of sensors based on magnetic principle of operation, the magnetic field of the magnets 48, 50 is detected by a sensing surface of the respective sensor 42, 44. Because of this influence, the output of the sensor changes its state. Depending on the type of sensors and respective electronic elements, the output of the sensors can be digital or analogue. In case of digital output, the output of each sensor 42, 44 has two discrete values in case of presence or absence of a magnet 48, 50.

The shape of the magnets 48, 50 can be rectangular, tubular or the like. In the positions when the magnetic fields of the magnets 48, 50 influences the sensing area of the respective sensors 42, 44 the areas of the magnets 48, 50 which generate magnetic field and the sensing areas of the sensors 42, 44 are in close proximity and positioned so that the sensing areas of the sensors 42, 44 is preferably parallel to the respective surfaces of the magnets 48, 50 which generate the magnetic fields.

The sensors 42, 44 are preferably carried by a part of door lock 10 which does not move during the operation of door lock, while the magnets 48, 50 are preferably carried by parts which are movable during the operation of door lock 10, for example movable linearly or rotatable or a combination of both. This description is not limiting as depending on specific execution of door lock 10. For instance, the relative position of the sensors and magnets may be inverse, so the sensors may be carried by movable parts and the magnets by non-movable parts.

The first proximity sensor 42 provides an information on whether the door of the appliance is open or closed. In some cases it may be required to know also an intermediate position of door, for example door partly open. This position of the door enables constant venting of drum of appliance, for example a washing machine, and can be required in case of automatic door opening of, for example, washing machines. In this case, after the washing cycle, the door of the appliance would be opened for a certain angle automatically or by manual action of user, but the hook 14 would still be engaged with rotating cam 12. In this situation door lock 10 would be neither in an open door or closed door position but would be in partly open position. In case of analogue output, the sensor enables to sense also intermediate positions of the moving element carrying the magnet 48, 50 relatively to sensor, enabling for example the possibility to sense a partially closed-door position, which can be advantageous for example to sense a partially open position of the door needed for venting the drum of the washing machine when it is not operating.

After the start of the cycle of the appliance, for example in case of washing machine a washing cycle, the appliance control unit generates an activating pulse to the electromagnetic actuator 24 and as the result solenoid core 26 moves to the extended position. As a result, the magnet 50 carried by the locking pin 30, reaches its "locked" position and influences the sensing area of the second proximity sensor 44 carried by the printed circuit board 46. As a result, the output of the second sensor 44 changes as compared to the previous "unlocked" condition and corresponds to a "locked" condition. This information, generated directly by the sensor or through elaboration of the signal by the electronic parts on the printed circuit board 46, is available to control unit of appliance, signaling a "locked" condition of the door lock 10.

In the embodiment shown in FIGS. 1 to 4, each sensor 42, 44 cooperates with only one magnet 48, 50. FIG. 5 shows an alternative embodiment in which each of the contactless proximity sensors 42, 44 cooperates with two magnets 48', 48" and 50', 50". This solution may be required in particular due to the following reasons:

a) In certain positions of the door sensing element 36 or locking pin 30, the magnetic fields of the magnets 48 or 50 do not influence the sensing areas of the sensors 42, 44, respectively. In the absence of magnetic field of the magnets 48 or 50, external magnetic fields can influence and disturb the function of the sensors 42 or 44. This can be for example caused by magnetic fields generated by electric motors, microwaves, mobile phones or other devices. To increase immunity of the sensors 42 and 44 to such external magnetic influences, a second magnet can be added onto door sensing element 36 and/or locking pin 30.

b) Certain type of sensors 42, 44 may require a change of the magnetic field influencing their sensing areas. More particularly, in order to change the output of the sensors 42, 44, a change of the polarity of the magnetic field influencing their sensing area, from positive to negative or vice versa, may be required.

In the embodiment of FIG. 5, the door sensing element 36 and/or the locking pin 30 carries a first and a second actuating element 48', 48" or 50', 50". The first and second actuating element 48', 48" or 50', 50" may be magnets with opposite polarities.

In the open door position the sensing area of the sensor 42 is influenced by the magnetic field of a first magnet 48', which has a first polarity, for example south. In the closed door position the sensing area of sensor 42 is influenced by the magnetic field of a second magnet 48" which has a second polarity, for example north.

In the same way, in the unlocked door position the sensing area of the sensor 44 is influenced by the magnetic field of a first magnet 50', which has a first polarity, for example south. In the locked door position the sensing area of sensor 44 is influenced by the magnetic field of a second magnet 50", which has a second polarity, for example north.

In case of sensors based on magnetic principle of operation, to increase immunity to external magnetic fields which may influence the proper operation of the sensors, some parts of the door lock 10 can be made of electrically conductive material to provide shielding. For example, this can be applied to housing and cover (not shown in the drawings).

The invention claimed is:

1. An electromagnetic door lock for locking a door of a domestic appliance, the electromagnetic door lock comprising:

a rotating cam rotating about an axis between an open-door position and a closed-door position and cooperating with a hook fixed to the door of the domestic appliance;

a locking device, which locks the rotating cam in the closed-door position, the locking device including:

a locking pin movable between a locking position and an unlocking position;

an electromagnetic actuator having at least a portion that is configured to reciprocally move along a straight-line movement path along first and second directions for reciprocally moving the locking pin along a straight-line movement path along third and fourth directions between the locking position and the unlocking position;

an actuator cam that aligns at least a portion of the locking pin with a longitudinal axis of the electromagnetic actuator and connects the electromagnetic actuator to the locking pin, wherein an engagement of the actuator cam with the locking pin converts the movement of the at least a portion of the electromagnetic actuator along the straight-line movement path along the first and second directions to movement of the locking pin along the straight-line movement path along the third and fourth directions; and a door sensing device including a door sensing element rotatably movable between a first position and a second position corresponding, respectively, to the open-door position and to the closed-door position of the rotating cam; and wherein at least one contactless proximity sensor detects at least one of a position of the locking pin and a position of the door sensing element.

2. The electromagnetic door lock of claim 1, wherein the at least one contactless proximity sensor includes a first contactless proximity sensor and a second contactless proximity sensor, and wherein:

the first contactless proximity sensor detects the closed-door position of the rotating cam by detecting a position of a first actuating element; and the second contactless proximity sensor detects the locking position of the locking pin by detecting a position of a second actuating element that is independently movable with respect to the first actuating element.

3. The electromagnetic door lock of claim 2, wherein the first or second contactless proximity sensor is a magnetic sensor, a magnetoresistive sensor, or an optical sensor.

4. The electromagnetic door lock of claim 3, wherein the first or second contactless proximity sensor is carried by a stationary support and cooperates with the first or second actuating element carried by the door sensing element or by the locking pin.

5. The electromagnetic door lock of claim 4, wherein the at least one of the first and second actuating elements is a magnet.

6. The electromagnetic door lock of claim 5, wherein the first and second actuating elements are magnets with opposite polarities with reference to a sensing area of a respective one of the first and second contactless proximity sensors.

7. The electromagnetic door lock of claim 4, wherein the stationary support carries electronic or electromechanical elements and electrical connections for a connection to a control unit of the domestic appliance.

8. An electromagnetic door lock for locking a door of a domestic appliance, the electromagnetic door lock comprising:

a rotating cam rotating about an axis between an open-door position and a closed-door position and cooperating with a hook fixed to the door of the domestic appliance;

a locking device, which locks the rotating cam in the closed-door position, the locking device including:

a locking pin movable between a locking position and an unlocking position;

a main lever that is movable and disengaged from the locking pin when the locking pin is in the unlocking position and engaged by the locking pin and locked against movement when the locking pin is in the locking position;

an electromagnetic actuator configured for moving the locking pin between the locking position and the unlocking position;

an actuator cam moving in unison with at least a portion of the electromagnetic actuator, wherein the actuator cam extends longitudinally from the at least a portion of the electromagnetic actuator and includes a first segment attached to an end of the at least a portion of the electromagnetic actuator and a second segment that locates the locking pin transversely to a longitudinal axis of the electromagnetic actuator, such that at least a portion of the locking pin intersects the longitudinal axis of the electromagnetic actuator during engagement of the actuator cam with the locking pin and engages the locking pin to move the locking pin transversely with respect to the movement of the at least a portion of the electromagnetic actuator and the movement of the actuator cam;

a door sensing device including a door sensing element movable between a first position and a second position corresponding, respectively, to the open-door position and to the closed-door position of the rotating cam;

a first contactless proximity sensor that is configured to detect a position of the locking pin, wherein the first contactless proximity sensor is included in a first sensor/actuating element pair that is arranged at a first location within the electromagnetic door lock that corresponds to an engagement location between the main lever and the locking pin when the locking pin is in the locking position, wherein the locking pin is located further from the end of the at least a portion of the electromagnetic actuator when the locking pin is in the unlocking position than when the locking pin is in the locking position; and a second contactless proximity sensor that is configured to detect a position of the door sensing element, wherein the second contactless proximity sensor is included in a second sensor/actuating element pair that is independent of the first sensor/actuating element pair and that is arranged at a second location within the electromagnetic door lock.

9. The electromagnetic door lock of claim 8, wherein:

a first actuating element in the first sensor/actuating element pair is configured for linear movement; and a second actuating element in the second sensor/actuating element pair is configured for pivoting movement.

* * * * *